(12) United States Patent
Tsukagoshi et al.

(10) Patent No.: US 8,855,379 B2
(45) Date of Patent: Oct. 7, 2014

(54) SAVING DEVICE FOR IMAGE SHARING, IMAGE SHARING SYSTEM, AND IMAGE SHARING METHOD

(75) Inventors: Kazuma Tsukagoshi, Kanagawa (JP); Yukinori Yokoyama, Kanagawa (JP); Karin Kon, Kanagawa (JP); Yuto Furukawa, Kanagawa (JP)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/434,606

(22) Filed: Mar. 29, 2012

(65) Prior Publication Data
US 2012/0183239 A1    Jul. 19, 2012

Related U.S. Application Data

(62) Division of application No. 12/411,921, filed on Mar. 26, 2009, now Pat. No. 8,166,034.

(30) Foreign Application Priority Data

Mar. 26, 2008    (JP) ................. 2008-080447

(51) Int. Cl.
*G06F 17/30*    (2006.01)
*G06K 9/50*    (2006.01)

(52) U.S. Cl.
CPC ...... *G06F 17/30265* (2013.01); *G06F 17/3028* (2013.01); *Y10S 707/915* (2013.01)
USPC ...................... 382/118; 707/915; 707/E17.09

(58) Field of Classification Search
CPC ................... G06F 17/30047; G06F 17/30247; G06F 17/30259; G06T 2207/30196; G06T 2207/30201
USPC ........................... 707/915, E17.09
See application file for complete search history.

(56) References Cited

U.S. PATENT DOCUMENTS

| 5,796,945 A * | 8/1998 | Tarabella ..................... 709/219 |
| 2003/0004916 A1* | 1/2003 | Lewis .............................. 707/1 |
| 2003/0033296 A1* | 2/2003 | Rothmuller et al. .............. 707/3 |

(Continued)

FOREIGN PATENT DOCUMENTS

| JP | 2003-150932 A | 5/2003 |
| JP | 2005-174308 A | 6/2005 |

(Continued)

OTHER PUBLICATIONS

Email Read Receipts, Nov. 18, 2004, pp. 1-3.*

*Primary Examiner* — Albert Phillips, III
(74) *Attorney, Agent, or Firm* — Sheppard Mullin Richter & Hampton LLP

(57) ABSTRACT

The saving device for image sharing includes an image acquiring unit configured to acquire the images offered by a sharer of the images, a sharee information storing unit configured to store sharee information with respect to at least one sharee, a subject assessing unit configured to assess whether or not a person subject is included in the acquired images, an image associating unit configured to associate the images assessed as not including a person subject with the images assessed as including a person subject, based on the sharee information, and a shared image determining unit configured to determine the images to be shared with the sharee or sharees from among the associated images and the images assessed as including a person subject, based on the sharee information. The image sharing system and an image sharing method use such a device.

20 Claims, 10 Drawing Sheets

(56) References Cited

U.S. PATENT DOCUMENTS

| | | |
|---|---|---|
| 2003/0037111 A1 | 2/2003 | Yoshioka |
| 2005/0105806 A1 | 5/2005 | Nagaoka et al. |
| 2005/0120050 A1* | 6/2005 | Myka et al. ............... 707/104.1 |
| 2008/0032739 A1* | 2/2008 | Hoodbhoy et al. ........ 455/556.2 |
| 2008/0162568 A1* | 7/2008 | Shen ........................ 707/104.1 |
| 2009/0005087 A1* | 1/2009 | Lunati et al. ................. 455/466 |
| 2009/0171783 A1* | 7/2009 | Raju ............................... 705/14 |
| 2011/0170770 A1* | 7/2011 | Remedios ..................... 382/162 |

FOREIGN PATENT DOCUMENTS

| | | |
|---|---|---|
| JP | 2007-272719 A | 10/2007 |
| JP | 2007-293399 A | 11/2007 |
| WO | 2009/082814 A1 | 7/2009 |

\* cited by examiner

FIG.3

| 1 | SHAREE ID | 00001 | |
|---|---|---|---|
| 2 | REPRESENT-ATIVE IMAGES | PRIORITY NO. = 1 | PRIORITY NO. = 2 |
| 3 | DELIVERY DESTINATION INFORMATION | XXXXX.ne.jp | |
| 4 | SHAREE LEVEL | HIGH | |
| 5 | SEX | FEMALE | |
| 6 | PREFERRED LAYOUT INFORMATION | PHOTO MOUNT: 001 FRAME: 003 TRIMMING: ROUNDED CORNER | |
| 7 | PREFERRED IMAGE KEYWORDS | PLANTS, FLOWERS | |

| 1 | SHAREE ID | 00002 | |
|---|---|---|---|
| 2 | REPRESENT-ATIVE IMAGES | PRIORITY NO. = 1 | PRIORITY NO. = 2 |
| 3 | DELIVERY DESTINATION INFORMATION | YYYYY.ne.jp | |
| 4 | SHAREE LEVEL | MEDIUM | |
| 5 | SEX | MALE | |
| 6 | PREFERRED LAYOUT INFORMATION | PHOTO MOUNT: 003 FRAME: NONE TRIMMING: NONE | |
| 7 | PREFERRED IMAGE KEYWORDS | CARS | |

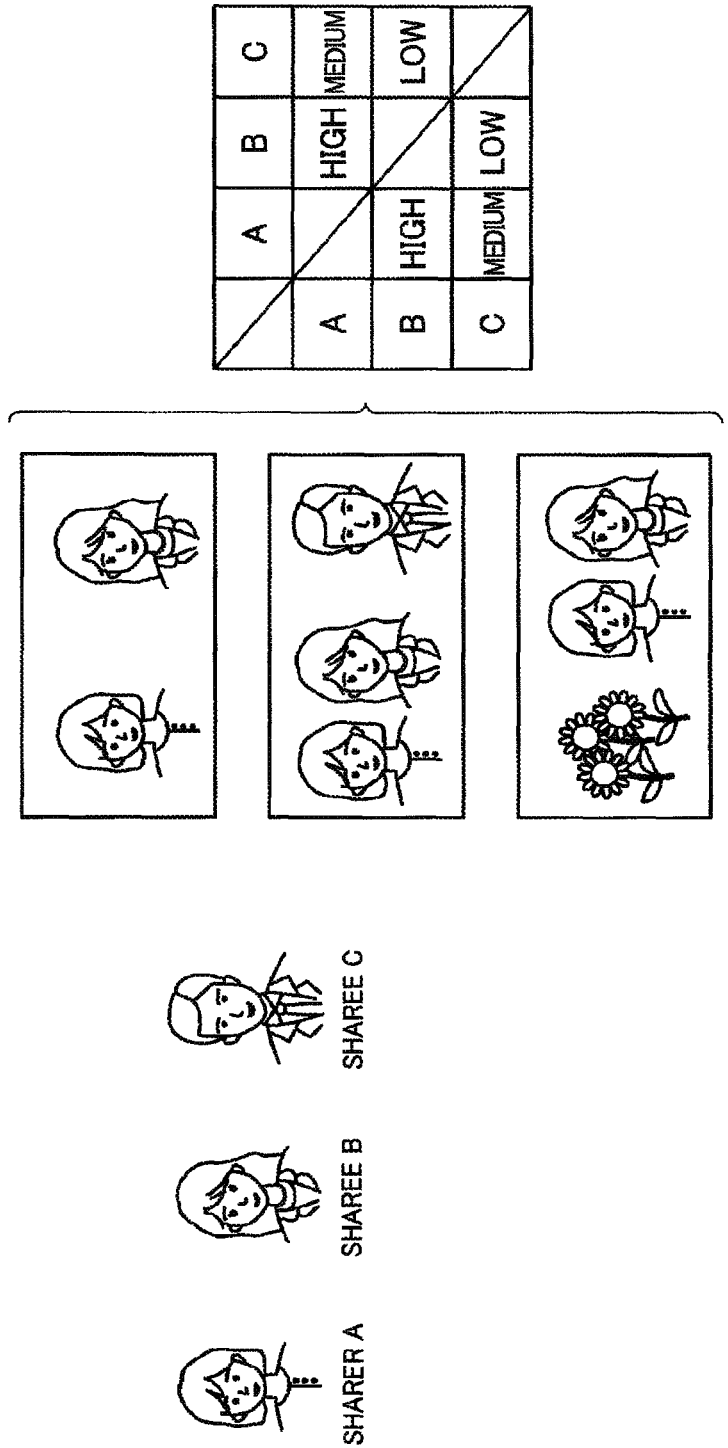

FIG. 9

[RESULTS OF SHARED IMAGE INFORMATION EXTRACTION]

| | | |
|---|---|---|
| ① | NUMBER OF IMAGES CONTAINING SHAREE | 10 |
| ② | NUMBER OF PREFERRED IMAGES | 5 |
| ③ | NUMBER OF PREFERRED IMAGES CONTAINING SHAREE | 3 |
| ④ | RANKING OF SIZES OF IMAGES SHARED WITH SHAREE, FROM THE LARGEST IN NUMBER ONWARD | 30*30<br>30*40<br>10*20 |
| ⑤ | RANKING OF MONTHS IN WHICH IMAGES SHARED WITH SHAREE WERE TAKEN, FROM THE LARGEST/SMALLEST IN NUMBER OF IMAGE-TAKING DAYS ONWARD | DECEMBER<br>JANUARY<br>AUGUST |
| ⑥ | RANKING OF PLACES (PREFECTURES) WHERE IMAGES SHARED WITH SHAREE WERE TAKEN, FROM THE LARGEST/SMALLEST IN NUMBER OF IMAGE TAKING ONWARD | TOKYO<br>KANAGAWA<br>CHIBA |

[RESULTS OF SHAREE INFORMATION EXTRACTION]

| | | |
|---|---|---|
| ⑦ | IMAGE SIZE MOST FOUND IN ALBUM | 10*20 |
| ⑧ | MONTH WITH MOST/LEAST DAYS FOUND IN ALBUM | DECEMBER |
| ⑨ | PLACE MOST/LEAST FOUND IN ALBUM | CHIBA |

SAVING DEVICE FOR IMAGE SHARING, IMAGE SHARING SYSTEM, AND IMAGE SHARING METHOD

This application is a divisional of U.S. application Ser. No. 12/411,921, filed Mar. 26, 2009, which claims priority to JP 2008-080447, filed Mar. 26, 2008, each of which is incorporated herein by reference in its entirety.

The entire contents of documents cited in this specification are incorporated herein by reference.

BACKGROUND OF THE INVENTION

The present invention relates to a saving device for image sharing, such as an image sharing server on a network, as well as an image sharing system and an image sharing method for classifying, saving, and sharing among a plurality of users the image data on a plurality of images offered by the sharer thereof, and more specifically to a saving device for image sharing such as an image sharing server, an image sharing system, and an image sharing method capable of automatically classifying a group of images related to a subject from a large-volume image group offered by the sharer thereof, for instance, a large-volume image group uploaded to a server on a network, and sharing the image data among a plurality of users depending on their personal preference.

In recent years, various image sharing systems configured to share among a plurality of users image data uploaded to a server or the like by a user have been proposed. Among such systems, there have been proposed systems configured to share images by extracting images of each user or images related to each user from a plurality of uploaded image data, and transmitting or enabling browsing of image data that satisfies specific conditions on a per user basis.

For example, with the image exchanging device and method described in JP 2007-293399 A, a large volume of images are shared and exchanged among a plurality of users. In JP 2007-293399 A, a plurality of images are subjected to face detection processing so as to extract those images having a person as the subject, and the extracted images are then subjected to face recognition processing based on face images of the users registered in advance. The images are then automatically classified on a per user (subject) basis, and the classified image data are delivered to the delivery destination of each user. In addition, JP 2007-293399 A describes a conventional method in which sharing of images is carried out by informing by e-mail and the like the URLs of the destinations where digital images are stored.

Further, in JP 2003-150932 A, similar to JP 2007-293399 A, is described an imaging processing device configured to perform face detection processing on inputted images and, in a case where a face is detected, execute face recognition processing by comparing that face with face images registered in advance as reference images, searching for and extracting images of that same person. In JP 2003-150932 A, if a found image was photographed after a predetermined period of time has elapsed from the time the reference image was taken, the found image is updated as the new reference image so as to ensure better searches.

Furthermore, in JP 2005-174308 A is described a method and apparatus for organizing digital media by face recognition. In JP 2005-174308 A, a plurality of image data (digital photographs) is extracted and classified based on categories such as date, event, location, people, etc., so as to organize the image data and enable browsing. For example, when "people" is selected as the category, the image data is subjected to face detection processing and face recognition processing to be classified on a per person subject basis.

In JP 2007-272719 A, it is described that the photographic processing apparatuses provided in different shops and networked with one another notify one another of registered information including the name (ID) of a taken-image file and shop information (position information (IP address) of a photographic processing apparatus on a network) as well as thumbnail images through a network, and a peer-to-peer transfer of a taken-image file is carried out from one photographic processing apparatus to another, based on the registered information, so as to acquire the taken-image file.

SUMMARY OF THE INVENTION

However, in the above-described JP 2007-293399 A, and JP 2003-150932 A, all image data are classified by face detection. Although this makes it possible to classify the image data that include a person, images that do not include a person, such as in a case where the subject is a plant or scenery cannot be classified, making it impossible to share such images among users.

Further, in JP 2005-174308 A, although images that do not include a face can also be classified when the images are classified based on categories such as date, event, or location, classification is always performed based on date, event, photographed location, etc., making it impossible to classify images for image sharing in accordance with each user, such as in accordance with the images related to the user or in accordance with the preferred images of the user, who is the sharee.

Furthermore, in conventional methods, the classified image data is delivered as is to the user who is the sharee, resulting in the problem that, in a case where there is a large volume of image data, the user who is to receive the images feels inconvenienced when browsing or organizing the images.

In the conventional method described in JP 2007-293399 A, the information to be given with respect to the image sharing includes only the information that an image has been shared (information given by e-male), the way of getting access to the shared image (URL path, password), and so forth. Accordingly, different sharees may be notified of the same information, and each sharee has to follow the path to the locations of shared images in order to ascertain what images have been shared in what amount (number).

The method disclosed in JP 2007-272719 A does not avoid problems either. If the registered information includes the ID of the taken-image file and the IP address but no thumbnail images, it cannot be ascertained what images have been shared in what amount (number) unless the sharee gets access to the photographic processing apparatus storing the taken-image file by using the IP address, and opens the taken-image file by using the ID. If the registered information includes thumbnail images, it cannot be ascertained yet what images have been shared in what amount (number) unless all the thumbnail images are browsed. In the case of the photographic processing apparatus disclosed in JP 2007-272719 A, the quantity of the information of which one apparatus notifies another apparatus sharing images with it can be large, with the registered information being capable of including thumbnail images. This feature, however, cannot be applied to cellular phones and so forth with smaller capacities and, even if applicable, an increased number of thumbnail images will be hard to download.

It is therefore a first object of the present invention to solve the above-described problems of prior art and provide a saving device for image sharing, such as an image sharing server, as well as an image sharing system and an image sharing method capable of simply and automatically classifying a large volume of image data offered by the sharer thereof, such as uploaded to a server on a network, even if the image data includes image data without images of a person, and sharing associated images and preferred images on a per user (sharee) basis.

Furthermore, it is a second object of the present invention to provide a saving device for image sharing, an image sharing system and an image sharing method capable of sharing image data in a format that is easy to use by the user who is the sharee.

It is a third object of the present invention to provide a saving device for image sharing, an image sharing system and an image sharing method capable of notifying, upon sharing of an image or album (image data), about additional information specific to the user as a sharee, such as information in which the sharee has interest and image information.

In order to achieve the above objects, the present invention provides a saving device for image sharing in which images offered by a sharer of the images for image sharing can be saved and accessibly shared among at least one sharee, comprising: an image acquiring means configured to acquire the images offered by the sharer; a sharee information storing means configured to store sharee information with respect to the at least one sharee; a subject assessing means configured to assess whether or not a person subject is included in the images acquired by the image acquiring means; an image associating means configured to associate images assessed as not including a person subject by the subject assessing means, with images assessed as including a person subject, based on the sharee information; and a shared image determining means configured to determine images to be shared with the at least one sharee from among the images associated by the image associating means and the images assessed as including a person subject by the subject assessing means, based on the sharee information.

Preferably, the subject assessing means further classifies the images assessed as including a person subject for each person subject and extracts them as included in identical subject groups.

It is also preferable that the sharee information includes a face image, and the subject assessing means identifies a person subject based on an image in one of the identical subject groups and the face image of the sharee information.

It is desirable that the subject assessing means automatically determines and maintains as the sharee information a level with respect to the identified person subject based on identification results of the person subject.

The saving device for image sharing of the present invention preferably comprises a sharing rule storing means configured to store sharing rules which are conditions for determining images to be shared with the at least one sharee. In that case, the shared image determining means determines the images to be shared based on the sharee information and the sharing rules.

The sharing rules are preferably registered or updated by the at least one sharer of the images to be shared.

Preferably, the saving device for image sharing of the present invention comprises a sharing information creating means configured to automatically create sharing information to be transmitted to the at least one sharee, based on the images to be shared and the sharee information.

The sharing information preferably includes a shared page in which the shared images are laid out in an album format, and access information for accessing the shared page.

In that case, it is preferable that the sharee information includes layout information of the at least one sharee, and the sharing information creating means lays out the images to be shared in accordance with the layout information.

It is preferable that the saving device for image sharing of the present invention comprises a sharing information storing means configured to store the sharing information.

It is also preferable that the saving device for image sharing of the present invention comprises a sharing information sending means configured to send the sharing information to the at least one sharee.

Preferably, the saving device for image sharing of the present invention comprises a completion reporting means configured to report completion of sharing to the at least one sharer after transmission of the sharing information to the at least one sharee.

In that case, a completion report includes at least one of information related to shared images, information related to images not shared, and information related to the at least one sharee.

The saving device for image sharing of the present invention is preferably an image sharing server in which the images uploaded by the sharer can be saved and accessibly shared among the at least one sharee, with the image acquiring means acquiring the images uploaded by the sharer.

It is also preferable that the saving device for image sharing of the present invention further comprises: a shared image information collecting means configured to collect information on the images to be shared; a sharee information collecting means configured to collect the sharee information with respect to the at least one sharee; a sharing information extracting means configured to extract, from the information on the images to be shared that is collected by the shared image information collecting means and the information with respect to the at least one sharee that is collected by the sharee information collecting means, information concerning the images to be shared in which the at least one sharee has interest as sharing information specific to the at least one sharee; and a sharing information notifying means configured to notify the at least one sharee of the sharing information extracted by the sharing information extracting means.

In order to achieve the objects as described before, the present invention also provides a saving device for image sharing in which images offered by a sharer of the images for image sharing can be saved and accessibly shared among at least one sharee, comprising: an image sharing means configured to share the images offered by the sharer among the at least one sharee as images to be shared; a shared image information collecting means configured to collect information on the images to be shared; a sharee information collecting means configured to collect information on the at least one sharee; a sharing information extracting means configured to extract, from the information on the images to be shared that is collected by the shared image information collecting means and the information on the at least one sharee that is collected by the sharee information collecting means, information concerning the images to be shared in which the at least one sharee has interest as sharing information specific to the at least one sharee; and a sharing information notifying means configured to notify the at least one sharee of the sharing information extracted by the sharing information extracting means.

In order to achieve the objects as above, the present invention also provides an image sharing system in which a sharer of images offers the images for image sharing so that the images can be accessibly shared among at least one sharee, comprising: the saving device for image sharing of the present invention as described above; and a terminal of the at least one sharee that accesses images shared on the saving device for image sharing.

Preferably, the image sharing system of the present invention further comprises: a terminal of the sharer that saves and uploads onto the saving device for image sharing the images; and a network on which the saving device for image sharing is disposed, and the terminal of the sharer and the terminal of the at least one sharee are connected with the saving device for image sharing through the network.

In order to achieve the objects as above, the present invention also provides an image sharing method in which images offered by a sharer of the images for image sharing can be saved and accessibly shared among at least one sharee in a saving device for image sharing, comprising the steps of: acquiring the images offered by the sharer; assessing whether or not the acquired images include a person subject; associating images assessed as not including a person subject with images assessed as including a person subject based on sharee information with respect to the at least one sharee that has been stored in advance; and determining images to be shared with the at least one sharee from the associated images based on the sharee information.

The saving device for image sharing to be used is preferably an image sharing server disposed on a network, in which the images uploaded by the sharer can be saved and accessibly shared among the at least one sharee. In that case, in the step of acquiring the images, the images uploaded by the sharer are acquired.

Preferably, the image sharing method of the present invention further comprises the steps of: collecting information on the images to be shared; collecting information on the at least one sharee; extracting, from the collected information on the images to be shared and the collected information on the at least one sharee, information concerning the images to be shared in which the at least one sharee has interest as sharing information specific to the at least one sharee; and notifying the at least one sharee of the sharing information as extracted.

The image sharing method of the present invention preferably comprises the steps of: classifying the images assessed as including a person subject for each person subject; and extracting them as included in identical subject groups. In that case, it is preferable that the sharee information includes a face image, and the inventive method further comprises the step of identifying a person subject based on an image in one of the identical subject groups and the face image of the sharee information.

It is also preferable that the image sharing method of the present invention comprises the step of automatically determining and maintaining as the sharee information a level with respect to the identified person subject based on identification results of the person subject.

Preferably, in the image sharing method of the present invention, sharing rules as conditions for determining images to be shared with the at least one sharee are stored in advance, and the images to be shared are determined based on the sharee information and the sharing rules. The sharing rules are preferably registered or updated by the at least one sharer of the images to be shared.

In the inventive method, it is preferable that the sharing information to be transmitted to the at least one sharee is automatically created, based on the images to be shared and the sharee information, and then transmitted to the sharee(s). The sharing information preferably includes a shared page in which the shared images are laid out in an album format, and access information for accessing the shared page.

In that case, it is preferable that the sharee information includes layout information of the at least one sharee, and the images to be shared are laid out in accordance with the layout information.

In the image sharing method of the present invention, moreover, it is preferable that completion of sharing is reported to the at least one sharer after transmission of the sharing information to the at least one sharee. In that case, a completion report includes at least one of information related to shared images, information related to images not shared, and information related to the at least one sharee.

Finally, in order to achieve the objects as described before, the present invention provides an image sharing method in which images offered by a sharer of the images for image sharing can be saved and accessibly shared among at least one sharee, comprising the steps of: sharing the images offered by the sharer among the at least one sharee as images to be shared; collecting information on the images to be shared; collecting information on the at least one sharee; extracting, from the collected information on the images to be shared and the collected information on the at least one sharee, information concerning the images to be shared in which the at least one sharee has interest as sharing information specific to the at least one sharee; and notifying the at least one sharee of the sharing information as extracted.

According to the saving device for image sharing, image sharing system and image sharing method of the present invention, in a case where a large volume image group is to be classified on a per user (sharee) basis, the images related to each user can be automatically classified and shared, even for those images that do not include a person. With this arrangement, regardless of whether or not a person is included in the image, images corresponding to each user can be easily shared, making it possible to share a larger number of user-preferred images and user-associated images.

Further, according to the present invention, the classified image data is automatically shared in a state in which the images have been laid out and edited as a page of an album, making image browsing and management very easy in comparison to conventional methods whereby image data only is simply delivered.

According to the present invention, moreover, the information which can be extracted automatically from the shared image or album information, that is to say, the information in which the sharee has interest, is added to the information to be given, which makes it possible to ascertain with ease, namely, without following the sharing path, what images have been shared.

BRIEF DESCRIPTION OF THE DRAWINGS

FIG. 3 is a diagram showing an example of sharee information;

FIG. 4 is a conceptual diagram showing an example of a method for determining the sharee level;

FIG. 9 is a diagram showing exemplary results of the extraction of the shared image information and the sharee information in the saving device for image sharing as shown in FIG. 8.

DETAILED DESCRIPTION OF THE PREFERRED EMBODIMENTS

The following describes in detail a saving device for image sharing of the present invention, which achieves an image sharing method of the present invention, as well as an image sharing system that utilizes this device, based on the preferred embodiments shown in the accompanying drawings.

Figure 1:
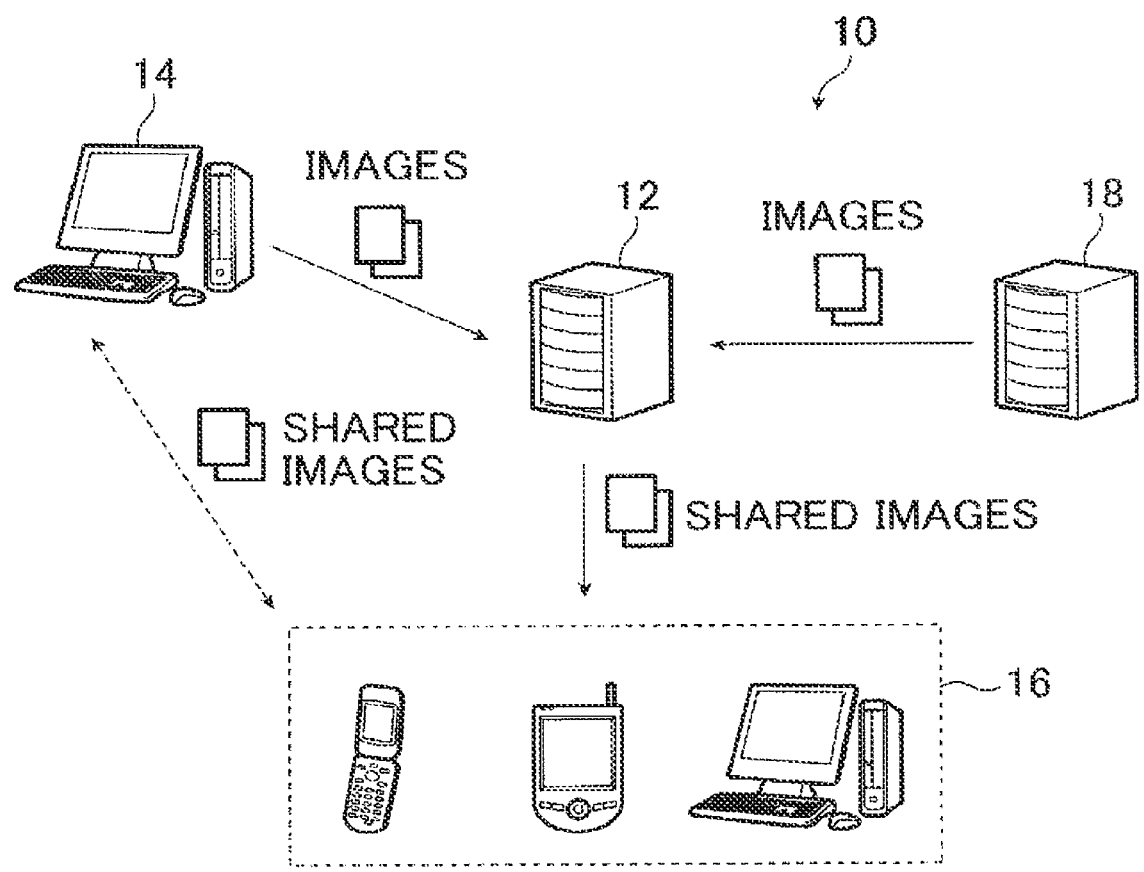
FIG. 1 is a block diagram showing an embodiment of the device configuration of an image sharing system of the present invention.

FIG. 1 is a block diagram showing an embodiment of the device configuration of an image sharing system of the present invention.

An image sharing system 10 shown in FIG. 1 comprises a sharing server 12, a personal computer (hereinafter "PC") 14 owned by an owner (hereinafter "sharer") of shared images, a terminal 16 owned by a sharee who is to be a co-owner of the shared images, and an image server 18.

The PC 14 uploads the images to be shared to the sharing server 12. While a conventional PC is used as the PC 14 in the present embodiment, the present invention is not limited thereto. Various types of devices can be used as long as the device is a terminal capable of saving image data and uploading the saved image data to the sharing server 12.

The terminal 16 is a terminal capable of browsing shared images from the sharing server 12. Various devices capable of browsing images via a network, such as a PC, cellular telephone, or portable terminal, may be used as the terminal 16. Further, in a case where a plurality of sharees exists, a plurality of terminals 16 may also exist.

The image server 18 is a server that saves images to be uploaded to the sharing server 12 and used as shared images. The image server 18 is not particularly limited. Any device capable of saving images and sending the saved images to the sharing server 12 via a network can be used. Further, a plurality of image servers 18 may also exist.

In the image sharing system 10, the sharing server 12 shares images acquired from the PC 14 of the sharer or from the image server 18 with the terminal 16 as shared images.

Figure 2:
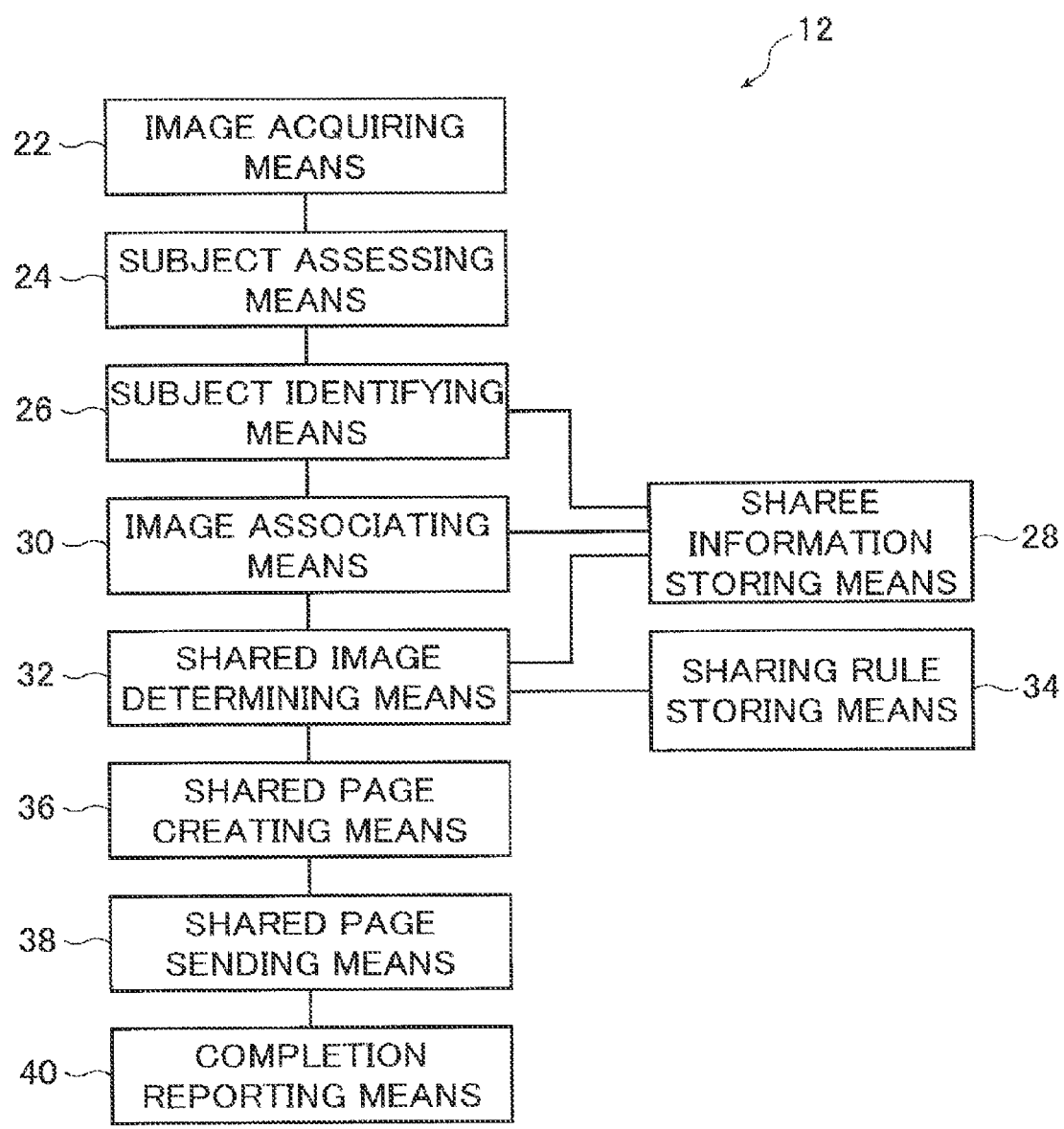
FIG. 2 is a block diagram showing an embodiment of the configuration of a saving device for image sharing of the present invention.

FIG. 2 is a block diagram showing an embodiment of the configuration of the sharing server (hereinafter "server") 12, which is a saving device for image sharing of the present invention.

The server 12 shown in FIG. 2 comprises image acquiring means 22, subject assessing means 24, subject identifying means 26, sharee information storing means 28, image associating means 30, shared image determining means 32, sharing rule storing means 34, shared page creating means 36, shared page sending means 38, and completion reporting means 40.

The image acquiring means 22 acquires image data uploaded to the image storing server on the network. The method of image uploading is not particularly limited. Any of the known various methods may be used. For example, the sharer may upload images saved on his/her PC 14 to the server 12. Or, the sharer may upload images saved on the image server 18 or images stored on a digital camera. The image acquiring means 22 acquires the image data uploaded to the server 12.

The image acquiring means 22 sends the acquired images to the subject assessing means 24.

The subject assessing means 24 subjects the images received from the image acquiring means 22 to face extraction processing, and assesses the face-extracted images as images that include a person as the subject. Furthermore, the subject assessing means 24, based on this assessment result, classifies all received images into images that include a person and images that do not include a person, and sends these images and the classification results to the subject identifying means 26.

The subject identifying means 26 performs face recognition processing on those images received from the subject assessing means 24 that have been assessed as images that include a person, and identifies and classifies the person subjects into groups per person subject.

Identification of the person subjects is performed based on sharee information, which is information of the sharees who are to be the co-owners of the shared images. The method of identifying the person subjects will be described later.

The sharee information storing means 28 is a database that stores information of sharees who are to be co-owners when images are shared by the image sharing system 10.

In the sharee information storing means 28 is registered in advance information, such as the ID, face image, and shared image delivery destination information of each sharee, as sharee information. This information can be added and updated as necessary. The sharee information, as described above, is used by the subject identifying means 26 to identify person subjects, and by the image associating means 30 to perform processing described later.

FIG. 3 shows an example of sharee information stored in the sharee information storing means 28.

In this embodiment, sharee IDs, representative images, delivery destination information, sharee levels, sex, layout preferences, and preferred image keywords are registered and stored as sharee information.

The sharee ID is an ID unique to the sharee, and is automatically uniquely set by the sharee information storing means 28 when sharee information is registered.

The representative image is a face image of the sharee. The representative image is used when the subject identifying means 26 identifies the person subject. That is, the subject identifying means 26 compares the face image in an image extracted by the subject assessing means 24 with the representative image stored as sharee information, and assesses whether or not the face images are of the same person. This assessment may be performed by known face recognition processing.

A plurality of representative images may be registered for a single sharee. In a case where a plurality of representative images are stored, a priority number for each representative image is set. Examples of standards for setting the priority numbers for representative images include images of the face straight on, images taken recently, images taken on a date closer to that of the image to be compared, images of a face size greater than or equal to a predetermined threshold, and images of a quality greater than or equal to a certain level. The priority numbers may be set so that those images that enable comparison with greater accuracy are given higher priority numbers.

Further, the representative images are updated occasionally as needed. This point will be described later.

The delivery destination information is the transmission destination information used when the shared page creating means 36 described later arranges shared images to be shared with a sharee and sends the access information for accessing the created shared page to the sharee. In this embodiment, an e-mail address is registered as the delivery destination information as an example. With this arrangement, the access information for accessing the shared page created in accordance with the sharee is delivered to the delivery destination information corresponding to the sharee.

The sharee level is automatically set in accordance with the relationship between the sharer and the sharee.

The sharee level is set based on the distance between the sharer and the sharee when the two are included together in an image, and based on the number of images that include the two together in the same image, for example, and is set higher in a case where the two are photographed close together, and in a case where there are many images that include the two together. Further, the sharee level is set lower in a case where the two are photographed farther apart, and in a case where there are few images that include the two together.

Further, the sharee level may be set not only between the sharer and sharee, but also between sharees.

In the example shown in FIG. 4, the sharer A and the sharee B are photographed together in all images, with a short distance between the two, resulting in a sharee B sharee level of "High." On the other hand, there is one image of sharee C and sharer A together, but in the image the two are separated by distance, resulting in a sharee C sharee level of "Medium."

The sharee level is automatically set and updated when a person subject is identified by the subject identifying means 26.

The sex of a sharee is also registered.

The preferred layout information is information pertaining to the preferred layout of the album on the network that is owned by the sharee. Matching the preferred layout information to the settings of the album owned by the sharee makes it possible to arrange the layout of the shared page with the other pages of the album owned by the sharee.

While the items set as preferred layout information are not particularly limited, the items may include, for example, the color and pattern type, etc., of the photo mount, the frame type, and whether or not there is any trimming. When shared images are laid out on a page of an album to create a shared page, a page corresponding to the preferences of the sharee is created based on the preferred layout information of the sharee.

The preferred image keywords related to the preferred images of the sharee are also registered. A registered keyword may be, for example, "flower" if the sharee likes flowers or "car" if the sharee likes cars. The registered keyword does not need to be a name of an object, but may be a color such as "red" or "blue," or a scenic backdrop such as "night."

The image associating means 30 is for associating an image assessed as not including a person by the subject assessing means 24 with an image assessed as including a person.

The image associating means 30 retrieves the sharee information of person subjects identified and classified into groups by the subject identifying means 26 from the sharee information storing means 28. Based on the photograph information of each image and the retrieved sharee information, the image associating means 30 then extracts the images to be associated with or related to an identified person subject and the images corresponding to the preferences of the person subject from the images assessed as not including a person, and classifies these images as images associated with the identified person subject.

Image association will now be described in detail with reference to FIG. 5.

Figure 5:
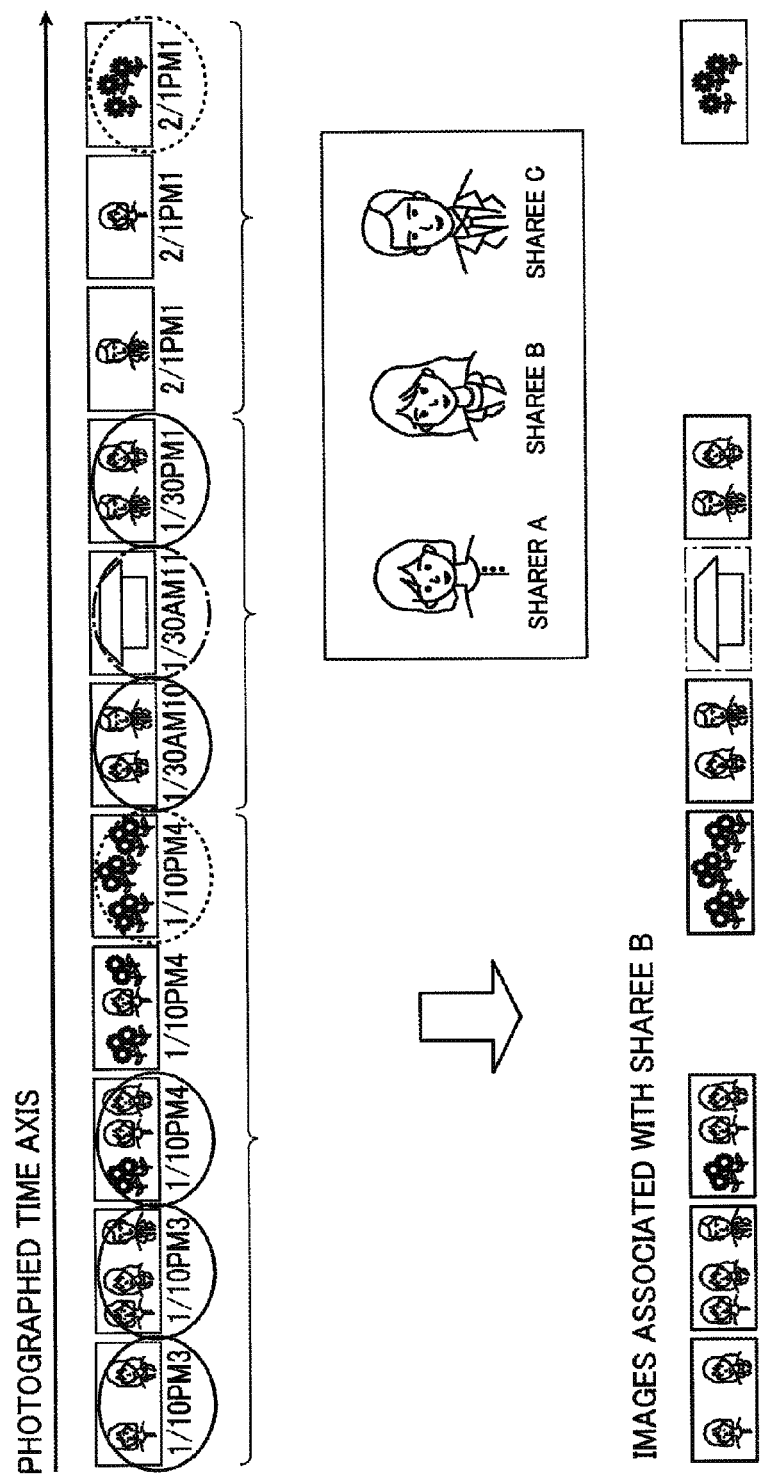
FIG. 5 is a conceptual diagram showing a method for extracting images associated with a sharee.

In FIG. 5, the images encircled by a solid line are images classified as a group that includes sharee B as a person subject identified by the subject identifying means 26, and are all images that include sharee B.

First, using the photograph information of each image, the image associating means 30 extracts information associated with the person subjects. Here, if the difference between the time at which an image that does not include a person was taken and the time at which an image classified into the group was taken is within a certain range, the image associating means 30 assesses that the image that does not include a person is associated with the identified person subject of the classified image, and classifies that image into that group. For example, in FIG. 5, given a time difference range of two hours, the image encircled by an alternate long and short dashed line was taken within just an hour from the image on the left and, thus, the two images are assessed as associated and classified into the group of sharee B.

Next, using the sharee information of the identified person subject corresponding to the classified group, the image associating means 30 extracts the preferred images of the sharee.

In FIG. 5, the sharee information of sharee B corresponds to sharee ID "00001" of FIG. 3. The preferred image keywords of sharee B are "plants" and "flowers."

Based on these keywords, the image associating means 30 extracts images of flowers from the images that do not include a person, and classifies these images as preferred images of sharee B. In FIG. 5, the two images encircled by a dashed line are images of flowers. These images, therefore, are extracted as preferred images of sharee B and classified into the group of sharee B.

Further, the preferred image keyword is not limited to the name of a subject, but may also be a color and so forth. For example, when "pink" is registered as a keyword, an image with a large pink area may be extracted and classified as an image associated with sharee B, based on the color information that results from image analysis.

Image extraction based on preferred image keywords may be performed by analyzing images using a known method and searching for associated images based on image characteristics, or by adding scene information or keywords to each image as tag information in advance at the time the image is taken and comparing those keywords with the preferred image keywords provided in the sharee information.

As described above, the associated images and preferred images of sharee B are then classified into a group.

The shared image determining means 32 determines the images to be shared with the sharee from among the images classified into groups on a per person subject basis by the subject identifying means 26 and the image associating means 30. The shared images are determined based on sharing rules stored in the sharing rules storing means 34 described later.

Here, the image sharing system 10 of the present invention automatically shares all classified images with sharees that correspond to the images. However, there are also cases where the classified images include poorly photographed images, and the sharer may not want to set all images as images subject to sharing. In such a case, to assess whether or not an image is subject to sharing, the sharer registers conditions for image sharing in advance as sharing rules.

An example of a sharing rule includes a setting that first indicates whether all images are to be subject to sharing or whether only those images that match specific conditions are to be subject to sharing. In a case where all images are to be subject to sharing, all images classified in the system are shared.

On the other hand, in a case where only images that match specific conditions are to be subject to sharing, conditions for image sharing are further set.

Such conditions may include, for example, a setting that indicates that only images that include a person are to be subject to sharing. Further, in a case where an image includes a person, whether or not the image is to be shared may be set in accordance with the photograph quality of the identified person, such as the sharer, the sharee, or another person subject. For example, a setting may be set so that a poor quality image, such as a blurred image, red eye image, sideways image, or non-smiling image, of the identified person is not shared. Or, a setting may be set so that an image is not shared if all person subjects in the image are of poor photograph quality.

Furthermore, in the case of an image that does not include a person, a setting may be set so that the image is shared if the image is not blurry, or if the image has been extracted by the image associating means 30 based on photograph information, or if the image has been extracted by the image associating means 30 based on sharee information, for example.

Setting the sharing rules in advance in this manner makes it possible for the sharer to extract and share images that will be received more favorably and with greater joy by the sharee.

The sharing rules are stored in the sharing rule storing means 34. The sharing rules may be uniquely set in the system, or may be set differently on a per sharer basis. The sharing rules may also be suitably changed as needed.

The shared page creating means 36 automatically lays out the shared images determined by the shared image determining means 32 in album format so as to create the page to be shared with the sharee.

This layout may be carried out based on the sharee level and preferred layout information of the sharee stored in the sharee information storing means 28. That is, the page is created using a layout that matches the preferred layout information of the sharee. Further, the images may be arranged so that images of persons having a high sharee level based on the sharee level information are included on the same page, for example.

The shared page creating means 36 comprises a function that sets access destination information, such as the URL for accessing the shared page created, and a function that associates the set access destination information with the shared page and stores the result as sharing information.

The shared page sending Means 38 notifies the sharee that a shared page has been created. The shared page sending means 38 notifies the sharee of the access destination information created by the shared page creating means 36 as the sharing notifying information, via known means such as e-mail.

The completion reporting means 40 reports that all processing has been completed to the sharer when the sharee has been notified by the shared page sending means 38. The reporting method is not particularly limited, and any known means such as e-mail may be used.

Next, the image sharing method of the present invention, and the specific action of a system that uses an image sharing server of the present invention which achieves the inventive method will be described based on the flowcharts of FIG. 6 and FIG. 7.

Figure 6:
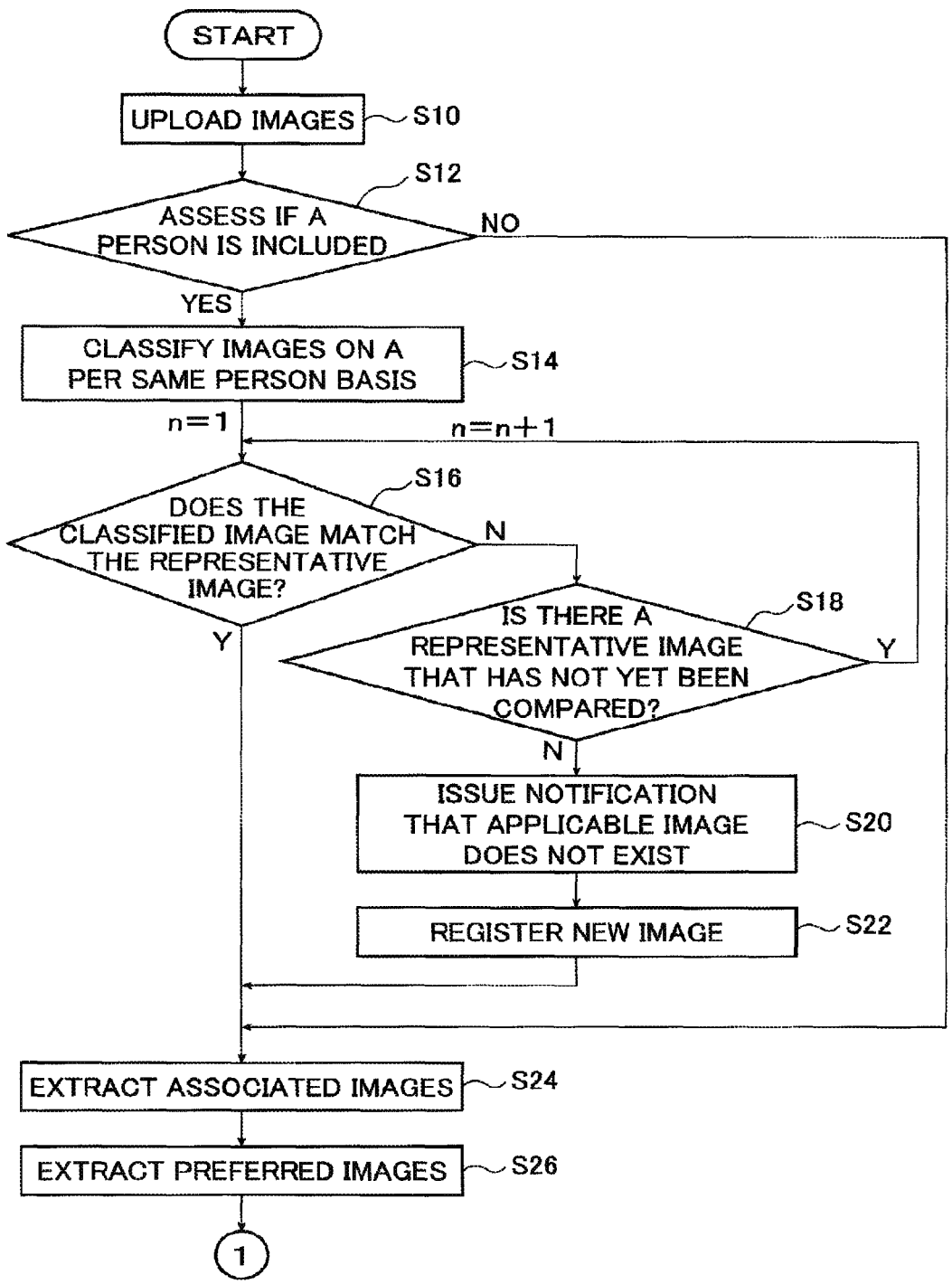
FIG. 6 is a flowchart showing an example of the first part of the flow of an image sharing method of the present invention.

First, in step S10 of FIG. 6, the sharer uploads the images he or she wants to share to the server. The uploaded images are acquired by the image acquiring means 22 and transmitted to the subject assessing means 24. Next, in step S12, each acquired image is assessed as to whether or not the image includes a person by the subject assessing means 24.

In a case where the image includes a person (in the case of "Yes" in step S12), the image is classified into a group of images that include the same face by face recognition processing in step S14. Furthermore, in step S16, the person subjects are identified per classified group.

Identification of person subjects is performed by the subject identifying means 26 by executing face recognition processing based on sharee information.

As described above, face images of the sharees are registered as representative images in sharee information. The subject identifying means 26 compares the representative image of each sharee with the face extracted from the image, and assesses whether or not the two persons are the same.

In a case where there is a plurality of representative images of one sharee, the subject identifying means 26 repeatedly conducts such comparisons based on a priority order, such as in the sequence of the sharee representative image having priority number 1, the sharee representative image having priority number 2, etc., until the subject identifying means 26 can assess that the persons are the same.

When such comparisons are repeated and it is found that a representative image of a person matching the face in the image does not exist even after comparisons have been made with all representative images of the sharees (in the case of "No" in step S18), the subject identifying means 26 assesses that sharee information is not registered for that person and notifies the sharer accordingly, prompting the sharer to register new sharee information (step S20). This notification may be performed by any applicable known notifying means, such as screen display or audio.

The sharer who receives the notification then registers sharee information for the person subject using the image used for comparison by the subject identifying means 26 as the representative image (step S22). Note that the representative image used for new registration is not limited to that image, and may be newly uploaded by the sharer, for example.

According to the above-described processing, images that include a person are classified into groups per person subject, and the person of each group is identified.

Next, the images that do not include a person are classified into these groups on a per person subject basis.

For those images assessed as not including a person in step S12 (in the case of "No" in step S12), the images associated with the sharee of each group identified by the subject identifying means 26 are extracted and classified into each group by the image associating means 30 (step S24). Furthermore, the image associating means 30 extracts the preferred images of each sharee and similarly classifies those images into each group (step S26).

Figure 7:
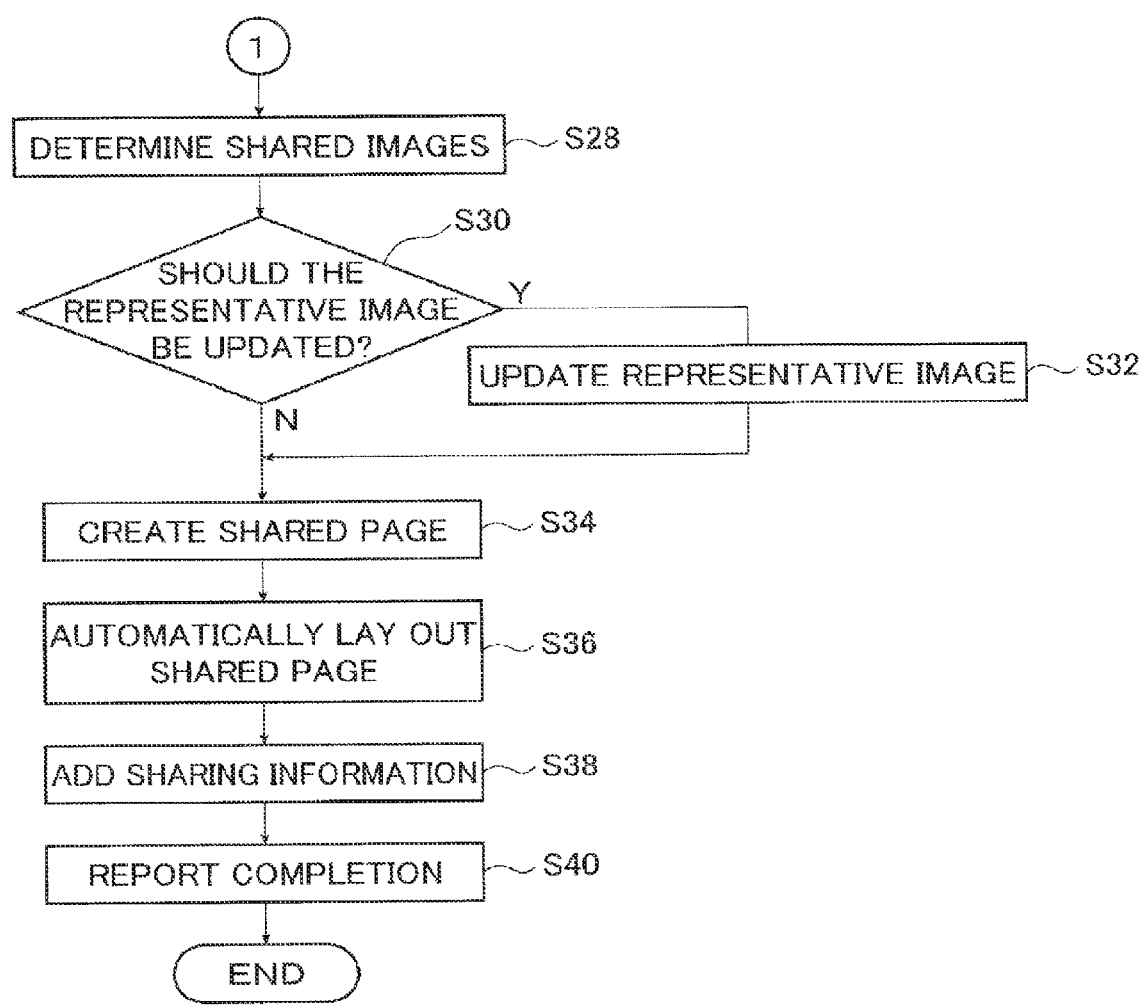
FIG. 7 is a flowchart showing an example of the second part of the flow of the image sharing method of the present invention.

After the images that do not include a person are also classified into each group as described above, the shared images per sharee are determined in step S28 of FIG. 7. Here, the images from among the images classified into each group per identified person subject that are to be shared with a sharee are determined based on sharing rules. With this arrangement, the images of poor photograph quality of the sharer or the sharee, etc., can be excluded, making it possible to establish only those images that will be enjoyed by the sharee as the images to be shared.

In a case where a more suitable image than the current image registered as the first representative image of a sharee is found during the repeated comparisons performed by the subject identifying means 26, it is advantageous to automatically change the first representative image to that image or to automatically change the priority order. To this end, when the images to be shared are determined and there is a more suitable image for the representative image in step S30 (in the case of "Yes"), the representative image stored in the sharee information registering means 28 is updated (step S32). The decision as to whether or not the representative image is to be updated may be made during the processing performed by the subject identifying means 26.

With this arrangement, the subject is always identified using the most preferred image as the representative image.

Next, in step S34, the shared page of the sharee is created. The shared page is created by automatically arranging the shared images determined in step S28 on an album page. Furthermore, in step S36, the shared page is automatically laid out. The layout is made based on the preferred layout information stored in the sharee information storing means 28. The preferred layout information includes, for example, the color and pattern of the photo mount, the frame type, whether or not there is any trimming, and its shape. The shared page creating means 36 creates the shared page based on this information using a preferred layout of the sharee.

When the shared page is created, a notification indicating that the shared page was created is automatically sent by e-mail, etc., to the sharee in step S38. At this time, the sharee is notified of the addition along with the method for accessing the shared page, such as the URL for accessing the shared page.

The sharee who receives the notification can then access the shared page in accordance with the contents of the notification, and then freely browse the shared page.

When all processing is completed, the completion reporting means 40 reports completion of the sharing process to the sharer.

In this manner, according to the image sharing system of the present invention, it is possible to extract and share images associated with a sharee and images preferred by a sharee, even if the images do not include a person. Furthermore, a shared page can be created according to the preferred layout of each sharee. As a result, images can be shared in an easy to view format that matches the preferences of the sharee, in accordance with each sharee.

In the embodiment as described above, the sharee is automatically notified by e-mail or the like that a shared page or the like has been created. According to the present invention, the notification may be made along with additional information varying from sharee to sharee, especially that of preference or strong preference, preferably of strongest preference, or again, of interest or high interest, preferably of highest interest for the relevant sharee.

Figure 8:
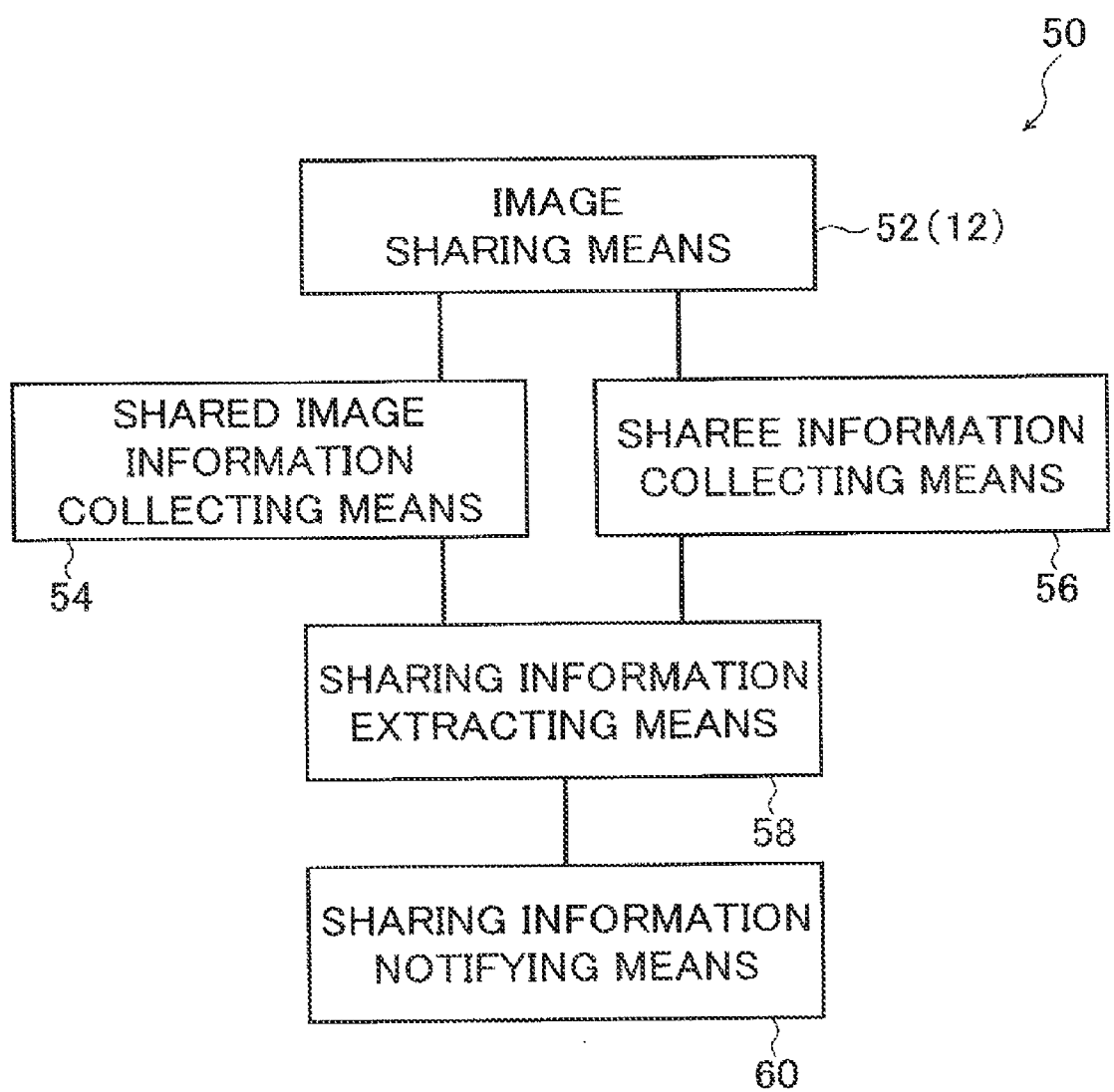
FIG. 8 is a block diagram showing another embodiment of the configuration of a saving device for image sharing of the present invention.

FIG. 8 is a block diagram showing another embodiment of the configuration of the saving device for image sharing of the present invention that is capable of additionally notifying of information varying from sharee to sharee when an image or electronic album is shared.

As shown in FIG. 8, an image server 50, which serves as the saving device for image sharing in this embodiment, comprises an image sharing means 52, a shared image information collecting means 54, a sharee information collecting means 56, a sharing information extracting means 58, and a sharing information notifying means 60.

The image sharing means 52 is adapted to save the images offered by the sharer thereof for image sharing, and accessibly share them among at least one sharee. In the present invention, the image sharing means 52 is preferably the server 12 of FIG. 2, but the present invention is not limited thereto. Any means capable of sharing images by some method or other including conventional ones may be utilized as long as it acquires the images, which are offered by the sharer thereof for image sharing, as the images to be shared with the sharee or sharees, saves the acquired images to be shared, and makes the acquired and saved images to be shared sharable among the sharee(s) in an accessible manner.

The shared image information collecting means 54 is adapted to extract and collect the information on the images to be shared in the image sharing means 52 and the information related therewith as the shared image information under specified conditions associated with the sharee, as well as to classify the images to be shared, and extract and collect the classification information. The shared image information collecting means 54 has one or more of the following functions as seen from the results of shared image information extraction shown in FIG. 9, for instance, and includes means for realizing such function(s): comparing an image to be shared with the image registered in advance in the image sharing means 52 (sharee information storing means 28 of the server 12) as the sharee information so as to count images containing the sharee; comparing the shared image information with the preferred image keywords also registered in advance as the sharee information so as to count images in which the sharee has interest; and extracting and collecting various kinds of information based on the meta-information on an image, such as image size, image-taking date, and image-taking place (GPS information).

In other words, examples of the shared image information to be extracted by the shared image information collecting means 54 include the number of the images containing the sharee, the number of the images preferred by the sharee, the number of the images preferred by the sharee and containing the sharee, the size of the shared images, the date on which the shared images have been taken, and the place where the shared images have been taken, as shown in FIG. 9. The present invention, however, is not limited to the above, and any information is thinkable as the shared image information as long as it can be extracted from the images to be shared and the related information associated therewith in relation to the sharee.

The sharee information collecting means 56 is adapted to collect the information on sharees. The sharee information collecting means 56 has at least either of the function of extracting and collecting the sharee information (profile information of the sharee, for instance) as registered in advance in the image sharing means 52 (sharee information storing means 28 of the server 12), and the function of collecting information from the album information owned by the sharee, and includes means for realizing such function(s).

In other words, examples of the sharee information to be extracted by the sharee information collecting means 56 include the image size (which type of image size is most found), the image-taking date (on what date (in what period) the most images have been taken), and the image-taking place (in what place the most images have been taken), as seen from the results of sharee information extraction shown in FIG. 9. The present invention, however, is not limited to the above, and any information is thinkable as the sharee information as long as it can be extracted from the information associated with the sharee.

The sharing information extracting means 58 is adapted to extract, from the shared image information collected by the shared image information collecting means 54 and the sharee information collected by the sharee information collecting means 56, information concerning the images to be shared in which the sharee has interest as the sharing information specific to the sharee, with the extraction being carried out in a per sharee manner. The sharing information extracting means 58 combines the shared image information and the sharee information to extract the information which is optimal for the sharee, that is to say, the information varying from sharee to sharee, especially that of preference or strong preference, preferably of strongest preference, or again, of interest or high interest, preferably of highest interest for the relevant sharee.

As seen from the results of shared image information extraction and sharee information extraction shown in FIG. 9, for instance, the sharing information extracting means 58 considers the information, for which the sharee wants/seeks most, to be the information in which the sharee has interest, and extracts it as the "sharing information," or concludes from the pieces (1) and (2) of the shared image information that the information piece (3) pleases the sharee most, and extracts the image information (3) as the "sharing information" in such a manner that it may be most conspicuous, or the like. The image information (3) may be made conspicuous by putting it at the head of an album, incorporating the thumbnail-form list of the images in question into the information to be given by e-mail and so forth, or by including in the information to be given such text information as the title or tag of an image.

The sharing information notifying means 60 is adapted to notify the sharee (terminal 16) of the sharing information extracted by the sharing information extracting means 58. The sharing information notifying means 60 may notify the sharee of the sharing information by e-mail, or in an RSS (RDF Site Summary) format when the sharee gets access to the network (web site).

The image server 50 in this embodiment of the present invention has such a fundamental configuration as above.

Figure 10:
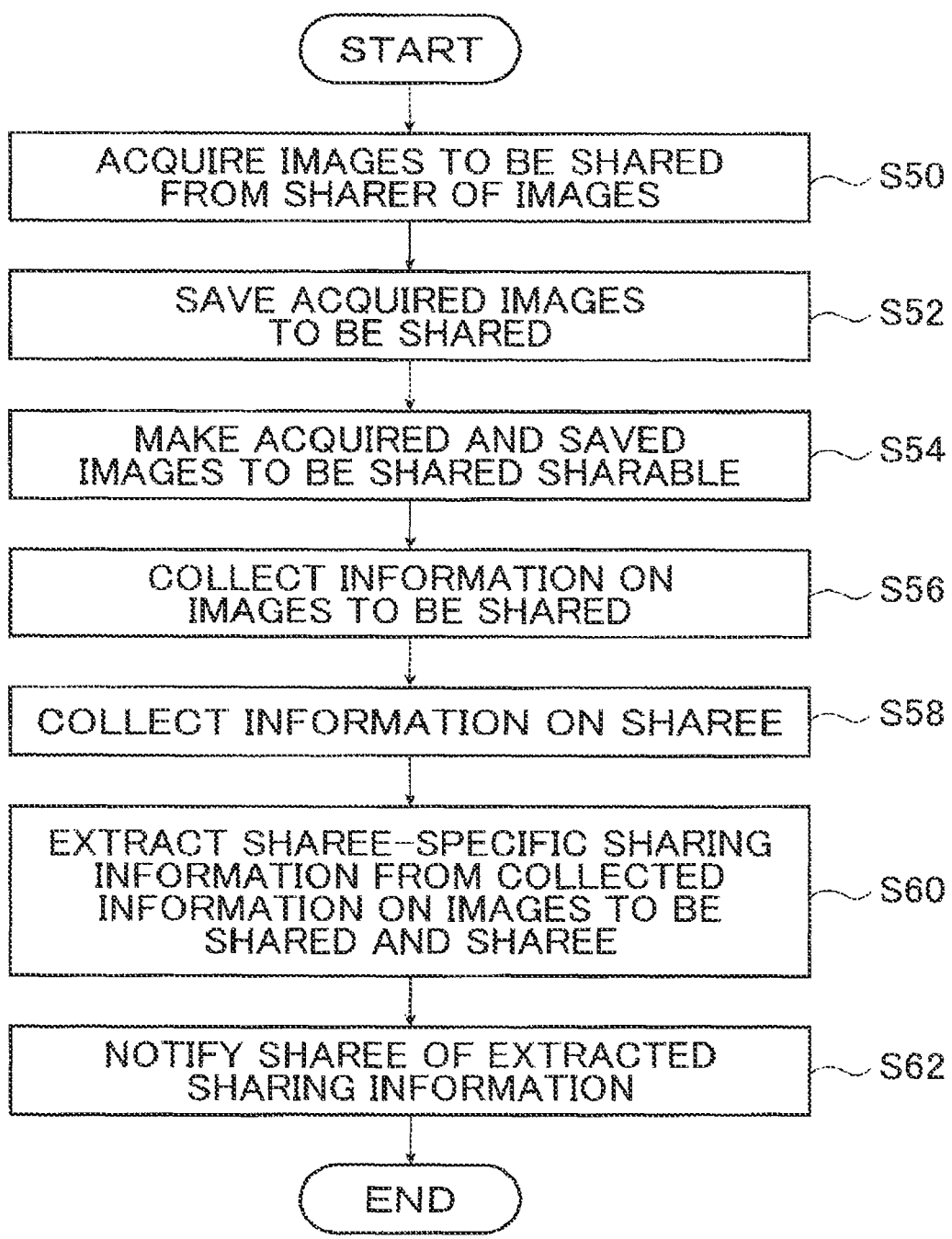
FIG. 10 is a flowchart showing an example of the process for notification by the saving device for image sharing as shown in FIG. 8.

Next, the image server 50 in this embodiment of the present invention, specific actions of the image sharing system using the server 50, and the image sharing method of the invention are described in reference to the flowchart of FIG. 10 showing an example of the process for notification by the saving device for image sharing.

In step S50, the images offered by the sharer thereof for image sharing are acquired as the images to be shared with the sharee.

In step S52, the acquired images to be shared are saved.

Subsequently, in step S54, the acquired and saved images to be shared are made sharable among the sharee(s) in an accessible manner.

By these steps S50 through S54, the sharer of images can share the images with the sharee.

The steps as above are effected by the image sharing means 52 of the image server 50 of the invention, preferably by the server 12 of FIG. 2, but the present invention is not limited thereto. Any device to which a known sharing method is applied may also be employed.

In the next step S56, the shared image information is collected with respect to the images to be shared. Collecting of the shared image information in step S56 is carried out by the shared image information collecting means 54.

In step S58, information on the sharee is collected by the sharee information collecting means 56.

In step S60, from the shared image information on the images to be shared that has been collected by the shared image information collecting means 54 and the sharee information on the sharee that has been collected by the sharee information collecting means 56, the information concerning the images to be shared in which the sharee has interest is extracted by the sharing information extracting means 58 as the information specific to the sharee.

Thereafter, the image server 50 (server 12) notifies the sharee (terminal 16) of the sharing information extracted by the sharing information extracting means 58 by e-mail or the like.

The image sharing method of the present invention has such a fundamental configuration as above.

While, in the embodiments as described above, the image sharing system 10 comprises the server 12 arranged on a network, the PC 14 of the sharer, the terminal 16 of the sharee, and the image server 18, the present invention is not limited thereto. In the case where the images to be shared are to be uploaded from the PC 14 of the sharer to the server 12, the image server 18 may be omitted. In that case, the image acquiring means 22 of the server 12 acquires the image data on the images saved in the PC 14 of the sharer through the network.

In the image sharing system 10 of the present invention, the images to be shared are saved and accessibly shared among the terminal(s) 16 of the sharee(s) by the server 12 on the network. The present invention is not limited to the above, and the images to be shared may be saved and accessibly shared among the terminal(s) 16 of the sharee(s) by the PC 14 of the sharer in itself, whereupon the PC 14 of the sharer and the terminal(s) 16 of the sharee(s) are connected with each other in a peer-to-peer manner as shown in FIG. 1 by a dotted line. In that case, the PC 14 of the sharer may serve as the saving device for image sharing of the present invention, and the server 12 may be omitted.

While the above has described in detail the image sharing server, system, and method of the present invention, note that the present invention is not limited to the above embodiments and various modifications may be made without departing from the spirit and scope of the invention.

What is claimed is:

1. A computer implemented method comprising:
    determining, by a computer system, a sharee level based on (a) identification of a person subject in one or more images, (b) a distance between a sharer and a sharee wherein the sharer and the sharee are included together in the one or more images, and (c) a number of images that include the sharee and the sharer together in the one or more images; and
    sharing, by the computer system, an album page of the sharer with the sharee based on the sharee level.

2. The computer implemented method of claim 1, wherein the determining a sharee level comprises setting the sharee level to one of a plurality of values.

3. The computer implemented method of claim 1, wherein the determining a sharee level comprises setting the sharee level to a value of high, medium, or low.

4. The computer implemented method of claim 1, wherein the determining a sharee level comprises at least one of:
    setting a value of the sharee level higher as the number of images that include the sharee and the sharer together increases; and
    setting the value of the sharee level lower as the number of images that include the sharee and the sharer together decreases.

5. The computer implemented method of claim 1, wherein the determining a sharee level comprises at least one of:
    setting a value of the sharee level higher as the distance between a sharer and a sharee decreases; and
    setting the value of the sharee level lower as the distance between a sharer and a sharee increases.

6. The computer implemented method of claim 1, wherein the album page matches a layout preferred by the sharee.

7. The computer implemented method of claim 1, wherein the sharing an album page of the sharer with the sharee is further based on sharing rules applicable to images for presentation in the album page.

8. The computer implemented method of claim 7, wherein the sharing rules are based on whether an image depicting a person includes at least one of a blurred image, a red eye image, a sideways image, and a non-smiling image.

9. The computer implemented method of claim 1, wherein the sharee level is updated when the person subject is identified.

10. The computer implemented method of claim 1, further comprising notifying the sharee of creation of the album page associated with a URL.

11. The computer implemented method of claim 1, wherein images of sharees having a sharee level of high are included on a same page.

12. A non-transitory computer storage medium storing computer-executable instructions that, when executed, cause a computer system to perform computer-implemented method comprising:
    determining a sharee level based on (a) identification of a person subject in one or more images, (b) a distance between a sharer and a sharee wherein the sharer and the sharee are included together in the one or more images, and (c) a number of images that include the sharee and the sharer together in the one or more images; and
    sharing an album page of the sharer with the sharee based on the sharee level.

13. The non-transitory computer storage medium of claim 12, wherein the determining a sharee level comprises setting the sharee level to one of a plurality of values.

14. The non-transitory computer storage medium of claim 12, wherein the determining a sharee level comprises setting the sharee level to a value of high, medium, or low.

15. The non-transitory computer storage medium of claim 12, wherein the determining a sharee level comprises at least one of:
    setting a value of the sharee level higher as the number of images that include the sharee and the sharer together increases; and
    setting the value of the sharee level lower as the number of images that include the sharee and the sharer together decreases.

16. The non-transitory computer storage medium of claim 12, wherein the determining a sharee level comprises at least one of:
    setting a value of the sharee level higher as the distance between a sharer and a sharee decreases; and
    setting the value of the sharee level lower as the distance between a sharer and a sharee increases.

17. A system comprising:
    at least one processor, and
    a memory storing instructions configured to instruct the at least one processor to perform:
    determining a sharee level based on (a) identification of a person subject in one or more images, (b) a distance between a sharer and a sharee wherein the sharer and the sharee are included together in the one or more images, and (c) a number of images that include the sharee and the sharer together in the one or more images; and
    sharing an album page of the sharer with the sharee based on the sharee level.

18. The system of claim 17, wherein the album page matches a layout preferred by the sharee.

19. The system of claim 17, wherein the sharee level is updated when the person subject is identified.

20. The system of claim 17, wherein images of sharees having a sharee level of high are included on a same page.

* * * * *